US012729297B2

(12) United States Patent
Storrer et al.

(10) Patent No.: US 12,729,297 B2
(45) Date of Patent: Sep. 8, 2026

(54) (METH)ACRYLATE COMPOSITION WITH IMPROVED LOW-TEMPERATURE ELASTICITY

(71) Applicant: SIKA TECHNOLOGY AG, Baar (CH)

(72) Inventors: Denise Storrer, Zürich (CH); Fabien Choffat, Rüttenen (CH)

(73) Assignee: SIKA TECHNOLOGY AG, Baar (CH)

( * ) Notice: Subject to any disclaimer, the term of this patent is extended or adjusted under 35 U.S.C. 154(b) by 144 days.

(21) Appl. No.: 18/560,998

(22) PCT Filed: Jun. 10, 2022

(86) PCT No.: PCT/EP2022/065870
§ 371 (c)(1),
(2) Date: Nov. 15, 2023

(87) PCT Pub. No.: WO2022/263325
PCT Pub. Date: Dec. 22, 2022

(65) Prior Publication Data

US 2024/0279456 A1 Aug. 22, 2024

(30) Foreign Application Priority Data

Jun. 15, 2021 (EP) .................................... 21179568

(51) Int. Cl.

| | |
|---|---|
| ***C08L 33/14*** | (2006.01) |
| ***C08L 33/10*** | (2006.01) |
| ***C09J 5/00*** | (2006.01) |
| ***C09J 11/08*** | (2006.01) |
| ***C09J 133/10*** | (2006.01) |
| ***C09J 133/14*** | (2006.01) |

(52) U.S. Cl.
CPC ............... *C08L 33/14* (2013.01); *C08L 33/10* (2013.01); *C09J 5/00* (2013.01); *C09J 11/08* (2013.01); *C09J 133/10* (2013.01); *C09J 133/14* (2013.01); *C08L 2201/08* (2013.01); *C08L 2205/03* (2013.01); *C08L 2207/53* (2013.01); *C09J 2433/00* (2013.01); *C09J 2475/00* (2013.01)

(58) Field of Classification Search
CPC ................................ C08L 33/10; C09J 133/10
See application file for complete search history.

(56) References Cited

U.S. PATENT DOCUMENTS

| | | | | |
|---|---|---|---|---|
| 3,994,764 | A | 11/1976 | Wolinski | |
| 4,439,600 | A | 3/1984 | Moran, Jr. | |
| 4,731,982 | A * | 3/1988 | Grant | C09K 3/1015 156/332 |
| 4,769,419 | A | 9/1988 | Dawdy | |
| 2016/0137765 | A1 * | 5/2016 | Uehara | C11D 7/30 252/8.62 |
| 2019/0233683 | A1 | 8/2019 | | |

FOREIGN PATENT DOCUMENTS

| | | | |
|---|---|---|---|
| CN | 103074000 | A | 5/2013 |
| EP | 2 003 153 | A1 | 12/2008 |
| EP | 2 272 922 | A1 | 1/2011 |

(Continued)

OTHER PUBLICATIONS

English language translation CN 110183975; Aug. 30, 2019.*
(Continued)

*Primary Examiner* — Margaret G Moore
(74) *Attorney, Agent, or Firm* — Oliff PLC

(57) ABSTRACT

A two-component composition including a component K2, including at least one initiator for free-radical curing, and a component K1, including a) at least one monomer A according to formula (IIIa), (IIIa)

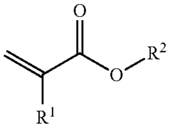

b) at least one monomer B according to formula (IIIb), (IIIb)

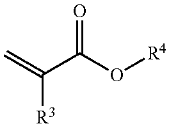

c) optionally between 10% by weight and 20% by weight, based on component K1, of at least one elastomer C of formula (I), (I)

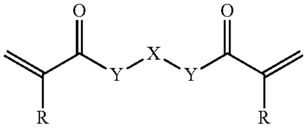

and d) optionally at least one additive selected from core-shell polymer, activator for free-radical curing, inhibitor for free-radical curing, filler and adhesion promoter. Provided that component K1 contains between 25% by weight and 75% by weight, based on component K1, of the mixture of monomer A and monomer B, and the mass ratio of monomer A to monomer B in component K1 is between 1:1 and 9:1.

15 Claims, No Drawings

(56) References Cited

FOREIGN PATENT DOCUMENTS

| | | | |
|---|---|---|---|
| WO | 01/44074 | A1 | 6/2001 |
| WO | 02/070619 | A1 | 9/2002 |
| WO | 2008/151849 | A1 | 12/2008 |
| WO | 2016/016286 | A1 | 2/2016 |

OTHER PUBLICATIONS

Aug. 30, 2022 International Search Report issued in International Patent Application No. PCT/EP2022/065870.

Dec. 14, 2023 International Preliminary Report on Patentability issued in International Patent Application No. PCT/EP2022/065870.

* cited by examiner

(METH)ACRYLATE COMPOSITION WITH IMPROVED LOW-TEMPERATURE ELASTICITY

TECHNICAL FIELD

The invention relates to the field of two-component (meth)acrylate adhesives, sealants and coatings.

PRIOR ART (Meth)acrylate compositions have long been used in particular as adhesives or adhesive coatings since they have good mechanical and optical stability and especially allow very good adhesion to many substrates. However, elastic properties are also important for adhesive bonds, seals and coatings, especially in applications that are subject to thermal or mechanical stress. Different approaches have been adopted to increase the flexibility and impact strength of (meth)acrylate compositions that otherwise are brittle and have very low breaking elongations, and thus to broaden their applicability to further fields.

Thus, for example, U.S. Pat. No. 3,994,764 describes the addition of non-reactive elastomers, which are solid at room temperature, to the (meth)acrylate composition. The disadvantage of such compositions is that the (meth)acrylate monomers must be selected such that the solid elastomer dissolves in them. Only methyl methacrylate meets this requirement to a suitable extent, this in turn having the disadvantage that it exudes a very unpleasant odor during use and is highly flammable.

The addition of reactive elastomers, which are liquid at room temperature, to the (meth)acrylate composition to improve flexibility is described, for example, in U.S. Pat. No. 4,769,419. Furthermore, U.S. Pat. No. 4,439,600 for example describes the addition of polyurethane polymers functionalized with (meth)acrylates. Such compositions have the disadvantage that they exhibit viscoelastic behavior after curing and undergo plastic deformation under load.

WO 02/070619 describes elastic (meth)acrylate compositions comprising a monofunctional (meth)acrylate monomer having a high glass transition temperature (Tg), a monofunctional (meth)acrylate co-monomer and a liquid elastomer. However, it was surprisingly found that, due to the strong plasticizing effect of a large part of the co-monomers contained therein, such compositions exhibit insufficient adhesive properties on certain substrates and have therefore proven unsuitable especially for the bonding of glass with polyvinyl chloride (PVC) and/or aluminum.

WO2008151849 describes elastic (meth)acrylate compositions comprising a first (meth)acrylate monomer selected from a specific list, preferably methyl methacrylate (MMA) and tetrahydrofurfuryl methacrylate (THFMA), and a second (meth)acrylate monomer, which is ethylhexyl acrylate (EHA) or maleic acid diallyl ester (MADAE), and additionally an elastomer. The compositions taught in this publication indeed have improved elastic properties and are particularly suitable for structural and semi-structural applications, for example for the bonding of glass with PVC and/or aluminum. However, these compositions in some cases still exhibit insufficient elasticity at low temperatures below zero celsius, thus limiting their application.

EP 2 272 922 describes (meth)acrylate-based compositions as adhesives, sealants or coatings with improved adhesion to galvanized surfaces containing (meth)acrylate monomers and at least one metal compound selected from CaO, MgO and $Ca(OH)_2$. In addition to other suitable elastomers, polyurethane (meth)acrylates are also taught as optional components of the composition. US 2019/0233683 discloses pressure sensitive adhesives for adhesive tapes and films comprising a polymer with poly(meth)acrylate and polyurethane segments in defined ratios. This results in a pressure sensitive adhesive film that remains transparent and shows no cloudiness upon mechanical deformation.

Some of the abovementioned publications describe (meth)acrylate compositions having improved elasticity. However, the elastic behavior of (meth)acrylate compositions is very dependent on ambient temperature. At very low temperatures well below 0° C. even the improved compositions of the prior art often show significant embrittlement. This is a problem for certain applications in exterior settings or in refrigerated interiors.

Another problem is that particularly suitable monomers for elastic properties such as methyl methacrylate (MMA) in particular are relatively volatile and have a strong odor and problematic EHS properties.

There is accordingly still a need for a (meth)acrylate composition which has a high elasticity at room temperature but at the same time is still sufficiently elastic even at very low temperatures down to −20° C. and which can be formulated without volatile, strongly unpleasant smelling monomers such as MMA.

SUMMARY OF THE INVENTION

It is accordingly an object of the present invention to provide two-component (meth)acrylate compositions which due to their optimal elastic properties are suitable for structural and semi-structural applications and which exhibit sufficiently elastic properties even at very low temperatures down to −20° C. Furthermore, these compositions shall be formulatable without the use of volatile and odor-intensive (meth)acrylate monomers such as MMA.

It has now been found that, surprisingly, this object is achieved by compositions as claimed in claim 1.

These compositions have a very high elasticity at room temperature, thus allowing them to absorb deformations, such as those caused for example by the so-called bimetal effect when applied to substrates having different linear coefficients of thermal expansion. Such deformations also occur, for example, when glass is bonded with metals or plastics. The breaking elongations of the compositions according to the invention measured according to DIN EN 53504 are at least 100%, preferably at least 150%, in particular at least 200% or higher at room temperature (23° C.). At the same time the compositions according to the invention have breaking elongations at a temperature of −20° C. of at least 20%, preferably at least 25%, in particular at least 30% or higher. Likewise, and non-obviously to a person skilled in the art, compositions according to the invention exhibit very good adhesion to a large number of substrates, but in particular to glass, PVC and aluminum.

Further aspects of the invention are the subject of further independent claims. Particularly preferred embodiments of the invention are the subject of the dependent claims.

WAYS OF EXECUTING THE INVENTION

The present invention relates to a two-component composition consisting of a component K1 comprising a) at least one monomer A according to formula (IIIa), (IIIa)

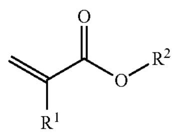

wherein $R^1$ is either a hydrogen atom or a methyl group, preferably a methyl group;

$R^2$ is either a linear or branched hydroxyalkyl group having 2 to 6 carbon atoms or a radical having 4 to 8 carbon atoms comprising either a phenyl group or an aliphatic 5- or 6-membered ring with at least one ether oxygen in the ring structure;

b) at least one monomer B according to formula (IIIb), (IIIb)

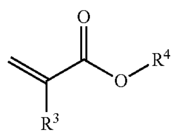

wherein $R^3$ is either a hydrogen atom or a methyl group, preferably a methyl group;

$R^4$ is a linear alkyl radical having more than 12 carbon atoms in the chain and preferably at most 20 carbon atoms in the chain;

c) preferably between 10% by weight and 20% by weight, based on component K1, of at least one elastomer C of formula (I), (I)

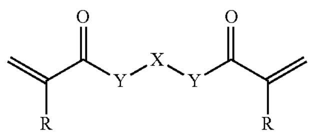

wherein R is either a hydrogen atom or a methyl group;

X is a polymeric polyol after removal of two OH groups;

and Y is O or NR", wherein R" is a hydrocarbon radical or a hydrogen atom, preferably a hydrogen atom; and d) preferably at least one additive selected from the group consisting of core-shell polymer, activator for free-radical curing, inhibitor for free-radical curing, filler and adhesion promoter;

with the proviso that component K1 contains between 25% by weight and 75% by weight, preferably between 40% by weight and 60% by weight, based on component K1, of the mixture of monomer A and monomer B, and with the proviso that the mass ratio of monomer A to monomer B in component K1 is between 1:1 and 9:1, preferably between 6:4 and 8:2;

and a component K2, comprising at least one initiator for free-radical curing.

In the present document substance names beginning with "poly", for example polyisocyanate, polyurethane, polyester or polyol, refer to substances formally containing two or more of the eponymous functional groups per molecule. The term "polymer" in the present document encompasses firstly a collective of macromolecules that are chemically uniform, but differ in their degree of polymerization, molar mass, and chain length, said macromolecules having been prepared by a polyreaction (polymerization, polyaddition, polycondensation). The term also encompasses derivatives of such a collective of macromolecules from polyreactions, i.e. compounds, obtained by reactions, for example additions or substitutions, of functional groups in defined macromolecules and which may be chemically uniform or chemically nonuniform. The term moreover also encompasses so-called prepolymers, i.e. reactive oligomeric preliminary adducts, whose functional groups are involved in the formation of macromolecules.

The term "polymeric polyol" in the present document encompasses any polymer as defined above which comprises more than one hydroxyl group. Accordingly, the term "polymeric diol" encompasses any polymer having precisely two hydroxyl groups.

The term "polyurethane polymer" encompasses all polymers produced by the so-called diisocyanate polyaddition process. This also includes polymers that are virtually or completely free of urethane groups. Examples of polyurethane polymers are polyether polyurethanes, polyester polyurethanes, polyether polyureas, polyureas, polyester polyureas, polyisocyanurates, and polycarbodiimides.

"Molecular weight" in the present document is to be understood as meaning the defined and discrete molar mass (in grams per mole) of a molecule or part of a molecule, also referred to as a "radical". "Average molecular weight" denotes the number average $M_n$ of an oligomeric or polymeric mixture, especially a polydisperse mixture, of molecules or radicals, which is typically determined by gel-permeation chromatography (GPC) against a polystyrene standard.

The term "(meth)acrylate" is to be understood as meaning "methacrylate" or "acrylate".

A dashed line in the formulae in this document in each case represents the bond between a substituent and the accompanying molecular radical, unless otherwise stated.

"Room temperature" refers to a temperature of approx. 23° C.

Unless otherwise stated, all industry standards or other standards mentioned in the document relate to the version of the industry standard or other standard that was valid at the time of filing of the patent application.

The terms "mass" and "weight" are used synonymously in this document. Thus a "percentage by weight" (% by weight) is a percentage proportion by mass which, unless stated otherwise, refers to the mass (weight) of the overall composition or, depending on the context, of the entire molecule.

The two-component composition according to the invention consists of a first component K1 and a second component K2.

Component K1 initially comprises at least one monomer A according to formula (IIIa), (IIIa)

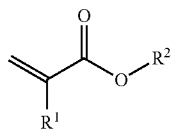

wherein $R^1$ is either a hydrogen atom or a methyl group, preferably a methyl group;

$R^2$ is either a linear or branched hydroxyalkyl group having 2 to 6 carbon atoms or a radical having 4 to 8 carbon atoms comprising either a phenyl group or an aliphatic 5- or 6-membered ring with at least one ether oxygen in the ring structure.

$R^1$ in formula (IIIa) is preferably a methyl group.

In a preferred embodiment $R^2$ in formula (IIIa) is a linear or branched hydroxyalkyl group having 2 to 4 carbon atoms. Examples of such monomers are hydroxypropyl acrylate (HPA), hydroxypropyl methacrylate (HPMA), hydroxybutyl acrylate (HBA) or hydroxybutyl methacrylate (HBMA), preferably hydroxyethyl acrylate (HEA) or hydroxyethyl methacrylate (HEMA), wherein hydroxyethyl methacrylate (HEMA) is particularly preferred.

In another preferred embodiment $R^2$ in formula (IIIa) is a radical having 4 to 8 carbon atoms which comprises an aliphatic 5- or 6-membered ring having one or two ether oxygens in the ring structure.

It is most preferable when $R^2$ in formula (IIIa) is a hydroxyethyl group or a benzyl group or at least one of the groups (IVa) to (IVc) in formula (IV), (IV)

(IVa)

(IVb)

(IVc)

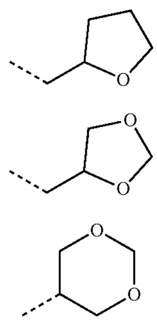

wherein the dashed lines in formula (IV) represent the bond between the oxygen atom and $R^2$. Examples of such monomers A are benzyl acrylate (BNA), benzyl methacrylate (BNMA), hydroxyethyl acrylate (HEA), hydroxyethyl methacrylate (HEMA), tetrahydrofurfuryl methacrylate (THFMA) and the isomer mixture glycerol formal methacrylate (comprising the structures (IVb) and (IVc) in formula (IV); CAS-No. 1620329-57-8) which is available from Evonik under the trade name GLYFOMA.

The most preferred monomers A are benzyl methacrylate (BNMA), tetrahydrofurfuryl methacrylate (THFMA), hydroxyethyl methacrylate (HEMA) and glycerol formal methacrylate (GLYFOMA).

It goes without saying that mixtures of these monomers A may also be employed.

Component K1 further comprises at least one monomer B according to formula (IIIb), (IIIb)

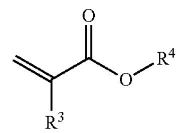

wherein $R^3$ is either a hydrogen atom or a methyl group, preferably a methyl group; and $R^4$ is a linear alkyl radical having more than 12 carbon atoms in the chain and preferably at most 20 carbon atoms in the chain.

$R^3$ in formula (IIIb) is preferably a methyl group.

$R^4$ in formula (IIIb) is preferably a linear alkyl radical having 13 to 18 carbon atoms in the chain. If there is a mixture of different chain lengths in the radical $R^4$ the average value of the chain lengths is formally used as a measure of the effective chain length in $R^4$.

Examples of such monomers B are lauryl tetradecyl acrylate (LATEA), lauryl tetradecyl methacrylate (LATEMA), stearyl acrylate (STEA), and stearyl methacrylate (STEMA). Lauryl tetradecyl methacrylate (LATEMA) and stearyl methacrylate (STEMA) are most preferred.

Component K1 contains between 25% by weight and 75% by weight, preferably between 40% by weight and 60% by weight, based on component K1, of the mixture of monomer A and monomer B.

A mass ratio of monomer A to monomer B in component K1 of between 1:1 and 9:1, preferably between 6:4 and 8:2, is to be established. Within these limits it is possible to achieve improved elasticity both at room temperature and at very low temperatures down to −20° C.

The two-component composition especially contains no further monomers than the above described monomers A and B.

Component K1 further preferably contains between 10% by weight and 20% by weight, based on component K1, of at least one elastomer C of formula (I), (I)

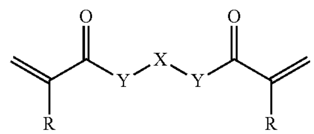

wherein R is either a hydrogen atom or a methyl group;

X is a polymeric polyol after removal of two OH groups;

and Y is O or NR", wherein R" is a hydrocarbon radical or a hydrogen atom, preferably a hydrogen atom.

The elastomer C of formula (I) preferably has an average molecular weight of 1000 to 40 000 g/mol, in particular of 1000 to 30 000 g/mol, preferably of 1000 to 20 000 g/mol.

In the elastomer C of formula (I) the radical X is a polymeric polyol after removal of two OH groups, wherein this polymeric polyol is in particular a polyalkylene polyol, a polyoxyalkylene polyol or a polyurethane polyol; a polyhydroxy-functional ethylene-propylene, ethylene-butylene or ethylene-propylene-diene copolymer; a polyhydroxy-functional copolymer of dienes such as 1,3-butadiene or diene mixtures and vinyl monomers such as styrene, acrylonitrile or isobutylene; a polyhydroxy-functional polybutadiene polyol; a polyhydroxy-functional acrylonitrile/butadiene copolymer; or a polysiloxane polyol.

Polyhydroxy-terminated acrylonitrile/butadiene copolymers are typically produced from carboxyl-terminated acrylonitrile/butadiene copolymers, commercially available for example under the name Hycar® CTBN from Emerald Performance Materials, LLC, USA, and epoxides or amino alcohols. Suitable elastomers C of formula (I) are commercially available for example from Kraton Polymers, USA, or under the trade names Hycar® VTB and Hycar® VTBNX from Emerald Performance Materials, LLC, USA.

The polymeric polyol is in particular a polymeric diol PD.

The elastomer C of formula (I) is preferably a polyurethane (meth)acrylate. Such compounds are typically producible from the reaction of at least one diol D with at least one diisocyanate and one (meth)acrylic acid, one (meth)acrylamide or one (meth)acrylic ester having a hydroxyl group.

In a first process this reaction may be carried out by reacting the diol D and the diisocyanate by customary processes, for example at temperatures of 50° C. to 100° C., optionally with co-use of suitable catalysts, ensuring that the NCO groups are present in stoichiometric excess relative to the OH groups. The isocyanate-terminated polyurethane polymer resulting from this reaction is then reacted with a (meth)acrylic acid, a (meth)acrylamide or with a (meth) acrylic ester having a hydroxyl group, in particular with a hydroxyalkyl (meth)acrylate such as hydroxypropyl acrylate (HPA), hydroxypropyl methacrylate (HPMA), hydroxybutyl acrylate (HBA) or hydroxybutyl methacrylate (HBMA), preferably with hydroxyethyl acrylate (HEA) or hydroxyethyl methacrylate (HEMA), or with a monohydroxypoly (meth)acrylate of a polyol, preferably of glycerol or trimethylolpropane, to afford a polyurethane (meth)acrylate.

In a second process the diol D may be reacted with the diisocyanate, wherein the OH groups are present in stoichiometric excess relative to the NCO groups. The hydroxyl-terminated polyurethane polymer resulting from this reaction may be esterified with a (meth)acrylic acid to afford the elastomer C of formula (I). A further process for producing the elastomer C comprises a first step of reacting the (meth)acrylic acid, the (meth)acrylamide or the (meth) acrylic ester having a hydroxyl group, in particular hydroxyalkyl (meth)acrylate such as hydroxypropyl acrylate (HPA), hydroxypropyl methacrylate (HPMA), hydroxybutyl acrylate (HBA) or hydroxybutyl methacrylate (HBMA), preferably hydroxyethyl acrylate (HEA) or hydroxyethyl methacrylate (HEMA), or a monohydroxypoly(meth)acrylate of a polyol, preferably of glycerol or trimethylolpropane, with at least one diisocyanate which is employed in an amount such that the NCO groups are present in excess relative to the OH groups. In a subsequent reaction the resulting intermediate comprising an isocyanate group is reacted with at least one diol D to afford the elastomer C of formula (I).

It is also possible to produce the elastomer C of formula (I) by esterification of a (meth)acrylic acid with a diol D, wherein the diol is in stoichiometric excess. In a subsequent reaction the partially esterified diol D reacts with a diisocyanate to afford the elastomer C of formula (I).

Preferred diols D are polyoxyalkylene diols, also known as "polyether diols", polyester diols, polycarbonate diols and mixtures thereof. The most preferred diols are polyoxyethylene diols, polyoxypropylene diols or polyoxybutylene diols.

The polyoxyalkylene diols may have different degrees of unsaturation (measured according to ASTM D-2849-69 and reported in milliequivalents of unsaturation per gram of polyol (mEq/g)). Those with a low degree of unsaturation are produced for example using so-called double metal cyanide complex catalysts (DMC catalysts) while those with a higher degree of unsaturation are produced for example using anionic catalysts such as NaOH, KOH, CsOH or alkali metal alkoxides.

The use of polyoxyalkylene diols having a low degree of unsaturation, in particular of less than 0.01 mEq/g, is preferred for diols having a molecular weight of ≥2000 g/mol.

Suitable diisocyanates in principle include all diisocyanates. Examples include hexamethylene 1,6-diisocyanate (HDI), 2-methylpentamethylene 1,5-diisocyanate, 2,2,4- and 2,4,4-trimethylhexamethylene 1,6-diisocyanate (TMDI), dodecamethylene 1,12-diisocyanate, lysine and lysine ester diisocyanate, cyclohexane 1,3-diisocyanate, cyclohexane 1,4-diisocyanate, 1-isocyanato-3,3,5-trimethyl-5-isocyanatomethylcyclohexane (=isophorone diisocyanate or IPDI), perhydro-2,4'-diphenylmethane diisocyanate and perhydro-4,4'-diphenylmethane diisocyanate, 1,4-diisocyanato-2,2,6-trimethylcyclohexane (TMCDI), 1,3- and 1,4-bis (isocyanatomethyl)cyclohexane, m- and p-xylylene diisocyanate (m- and p-XDI), m- and p-tetramethyl-1,3-xylylene diisocyanate, m- and p-tetramethyl-1,4-xylylene diisocyanate, bis(1-isocyanato-1-methylethyl)naphthalene, tolylene 2,4-diisocyanate and 2,6-diisocyanate (TDI), diphenylmethane 4,4'-diisocyanate, 2,4'-diisocyanate, and 2,2'-diisocyanate (MDI), phenylene 1,3-diisocyanate and 1,4-diisocyanate, 2,3,5,6-tetramethyl-1,4-diisocyanatobenzene, naphthalene 1,5-diisocyanate (NDI), 3,3'-dimethyl-4,4'-diisocyanatobiphenyl (TODI), oligomers and polymers of the abovementioned isocyanates and also any desired mixtures of the abovementioned isocyanates.

1-Isocyanato-3,3,5-trimethyl-5-isocyanatomethylcyclohexane (IPDI) is a preferred diisocyanate.

It is most preferable when elastomer C is a polyurethane (meth)acrylate, in particular producible from the reaction of at least one diol D, in particular a polyoxypropylene diol, with at least one diisocyanate and one (meth)acrylic ester having a hydroxyl group, wherein

- the diol D reacts with a diisocyanate, in particular isophorone diisocyanate, which is present in stoichiometric excess;
- and the resulting isocyanate-terminated polyurethane is reacted with the (meth)acrylic ester having a hydroxyl group, in particular with a hydroxyalkyl (meth)acrylate, preferably with hydroxyethyl acrylate (HEA) or hydroxyethyl methacrylate (HEMA), to afford the elastomer C of formula (I).

A particularly preferred embodiment of component K1 contains tetrahydrofurfuryl methacrylate (THFMA) as monomer A, lauryl tetradecyl methacrylate (LATEMA) and/or stearyl methacrylate (STEMA) and in particular no further monomers as monomer B, and a polyurethane (meth) acrylate as elastomer C.

Another particularly preferred embodiment of component K1 contains glycerol formal methacrylate (GLYFOMA) as monomer A, lauryl tetradecyl methacrylate (LATEMA) and/or stearyl methacrylate (STEMA) and in particular no further monomers as monomer B, and a polyurethane (meth) acrylate as elastomer C.

A further particularly preferred embodiment of component K1 contains hydroxyethyl methacrylate (HEMA) as monomer A, lauryl tetradecyl methacrylate (LATEMA) and/or stearyl methacrylate (STEMA) and in particular no further monomers as monomer B, and a polyurethane (meth) acrylate as elastomer C.

A further particularly preferred embodiment of component K1 contains benzyl methacrylate (BNMA) as monomer A, lauryl tetradecyl methacrylate (LATEMA) and/or stearyl methacrylate (STEMA) and in particular no further monomers as monomer B, and a polyurethane (meth)acrylate as elastomer C.

It is preferable when in component K1 the composition additionally contains between 0.5% by weight and 5% by weight, based on component K1, of an adhesion promoter, in particular an organosilane, and/or a metal (meth)acrylate or a (meth)acrylate of formula (II).

(II)

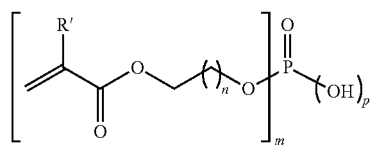

The radical R' is either a hydrogen atom or a methyl group, n represents a value from 1 to 15, in particular from 1 to 5, preferably from 1 to 3, m represents a value from 1 to 3 and p represents a value of 3 minus m.

Preferred metal (meth)acrylates are metal (meth)acrylates of calcium, magnesium or zinc having a hydroxyl group and/or (meth)acrylic acid or (meth)acrylate as a ligand or anion. Particularly preferred metal (meth)acrylates are zinc (meth)acrylate, calcium (meth)acrylate, Zn(OH) (meth) acrylate and magnesium (meth)acrylate.

Preferred (meth)acrylates of formula (II) are 2-methacryloyloxyethyl phosphate, bis(2-methacryloyloxyethyl) phosphate and tris(2-methacryloyloxyethyl) phosphate and mixtures thereof.

Preferred organosilanes are epoxy-functional silanes, in particular 3-glycidoxypropyltrimethoxysilane.

Adhesion promoters are used to improve adhesion to special substrates. The use of phosphorus-containing (meth) acrylates according to formula (II) is especially advantageous for metal surfaces (aluminum, anodized aluminum, etc.).

Organosilanes improve adhesion to glass and ceramic surfaces.

Metal (meth)acrylates are also advantageous for bonding to metal surfaces for example.

It goes without saying that mixtures of different adhesion promoters may also be employed.

The proportion of the adhesion promoter optionally present in component K1 is preferably between 1% and 3% by weight, based on component K1.

Furthermore, the composition in component K1 may preferably additionally contain at least one core-shell polymer. Core-shell polymers consist of an elastic core polymer (core) and a rigid shell polymer (shell). Especially suitable core-shell polymers consist of a rigid shell of a rigid thermoplastic polymer grafted onto a core of crosslinked elastic acrylate or butadiene polymer. Particularly suitable core-shell polymers are those which swell up in monomer A and/or in co-monomer B but do not dissolve therein.

Preferred core-shell polymers are so-called MBS polymers which are commercially available for example under the trade name Clearstrength® from Arkema Inc., USA, or Paraloid® from Rohm and Haas, USA. The core-shell polymers are preferably employed in an amount of 0.01% to 30% by weight, in particular of 5% to 20% by weight, based on component K1.

Furthermore, the composition in component K1 may additionally preferably contain at least one activator for free-radical curing, also referred to as a catalyst. The activator is in particular a tertiary amine, a transition metal salt or a transition metal complex. Examples of such suitable tertiary amines are N,N-dimethylaniline, N,N-diethylaniline, N,N-dimethyl-p-toluidine, N,N-diethyl-p-toluidine, N-methyl-N-hydroxyethyl-p-toluidine, N,N-bis(2-hydroxyethyl)-p-toluidine and alkoxylated N,N-bis(hydroxyethyl)-p-toluidines, N-ethoxylated p-toluidine, N-alkylmorpholine and mixtures thereof. Transition metal salts and transition metal complexes are for example salts and complexes of cobalt, nickel, copper, manganese or vanadium. Mixtures of such substances may also be used as activator. N,N-bis(2-hydroxyethyl)-para-toluidine is most preferred as activator.

The activator is preferably employed in an amount of 0.01% to 2.5% by weight, in particular of 0.5% to 2.5% by weight, based on component K1.

It is preferable when the composition in component K1 additionally contains an inhibitor for free-radical curing. This is selected from substances which slightly retard or moderate the free-radical mechanisms of curing or inhibit undesired curing reactions (for example UV light- or atmospheric oxygen-induced mechanisms), thus leading to improved storage stability and/or a more controlled, more uniform curing.

It is preferable when component K1 contains between 0.001% by weight and 0.5% by weight, based on component K1, of at least one inhibitor for free-radical curing, in particular an alkylated phenol, preferably 2,6-di-tert-butyl-p-cresol.

Furthermore, component K1 may preferably additionally contain at least one filler. Especially suitable fillers include natural, ground or precipitated calcium carbonates (chalks), which are optionally coated with fatty acids, in particular stearates, montmorillonites, bentonites, barium sulfate ($BaSO_4$, also known as barite or heavy spar), calcined kaolins, quartz flour, aluminum oxides, aluminum hydroxides, silicas, in particular pyrogenic silicas, modified castor oil derivatives and polymer powders or polymer fibers. Calcium carbonates are preferred and coated calcium carbonates are most preferred.

The filler is typically employed in an amount of 0.01% to 35% by weight, in particular of 5% to 30% by weight, preferably 15% to 25% by weight, based on component K1.

The second component K2 of the two-component composition comprises at least one initiator for free-radical curing. The initiator is a free-radical former that forms reactive free-radicals, thus initiating the free-radical curing mechanism of the monomers in component K1.

Molecules suitable as such free-radical formers are in particular those which, under the influence of heat or electromagnetic radiation, form free-radicals which then result in polymerization of the composition.

Free-radical formers especially include thermally activatable free-radical formers and photoinitiators.

Preferred thermally activatable free-radical formers especially include those which are still sufficiently stable at room temperature but form radicals at even slightly elevated temperature. Such free-radical formers include in particular a peroxide, a perester or a hydroperoxide. Organic peroxides are preferred. Dibenzoyl peroxide is most preferred.

Photoinitiators are free-radical formers which form free-radicals under the influence of electromagnetic radiation. Especially suitable is a photoinitiator which forms free-radicals upon irradiation with electromagnetic radiation having a wavelength of 230 nm to 400 nm and is liquid at room temperature.

It is particularly preferable when the photoinitiator is selected from the group consisting of α-hydroxyketones, phenylglyoxylates, monoacylphosphines, diacylphosphines, phosphine oxides and mixtures thereof, in particular 1-hydroxycyclohexylphenylketone, benzophenone, 2-hydroxy-2-methyl-1-phenylpropanone, methylphenyl glyoxylate, oxyphenylacetic acid 2-[2-oxo-2-phenyl-acetoxyethoxy] ethyl ester, oxyphenylacetic acid 2-[2-hydroxyethoxy]ethyl ester, diphenyl(2,4,6-trimethylbenzoyl)phosphine oxide, phenylbis(2,4,6-trimethylbenzoyl)phosphine oxide and mixtures thereof. Such photoinitiators are for example commercially available from the IRGACURE® and DAROCUR® product lines of Ciba Speciality Chemicals, Switzerland. Mixtures of photoinitiators may also be used.

Component K2 of the two-component composition preferably contains between 5% by weight and 75% by weight, based on component K2, of the at least one initiator for free-radical curing, wherein said initiator is especially a thermally activatable free-radical former, preferably a peroxide, a hydroperoxide or a perester, most preferably dibenzoyl peroxide, or wherein said initiator is a photoinitiator, in particular a photoinitiator which forms free-radicals upon irradiation with electromagnetic radiation having a wavelength of 230 nm to 400 nm.

Dibenzoyl peroxide is most preferred as the initiator in component K2. This is preferably employed dispersed in a plasticizer.

Component K2 of the composition according to the invention preferably additionally contains at least one additive selected from the group consisting of plasticizer, filler, thixotropic additive and colorant, in particular all of these additives.

Suitable plasticizers include all nonreactive substances which are liquid at room temperature and are typically employed in (meth)acrylate compositions in this function.

Suitable fillers include for example the same fillers as described for component K1.

Suitable colorants include nonreactive organic dyes and pigments.

Suitable thixotropic additives include all such additives typically used in (meth)acrylate compositions.

The composition may optionally additionally contain further constituents in one or both components. Such additional constituents include impact modifiers, dyes, pigments, inhibitors, UV and heat stabilizers, metal oxides, antistats, flame retardants, biocides, plasticizers, waxes, leveling agents, adhesion promoters, thixotropic agents, spacers and further raw materials and additives known to a person skilled in the art.

The composition according to the invention is a two-component composition, wherein the two components K1 and K2 thereof are stored separately from one another until application. The first component K1 especially includes those ingredients of the described composition which comprise free-radically polymerizable groups. The second component K2 especially includes the free-radical formers, also known as initiators. Furthermore, other constituents, in particular those that impair the storage stability of the composition through reaction with one another, can also be stored separately in a two-component composition.

In the described two-component compositions it is typically the case that component K1 comprises the constituents monomers, elastomers, core-shell polymers, catalysts, adhesion promoters, pigments and fillers, and component K2 comprises the constituents free-radical initiators, pigments and fillers. The mixing ratio of K1 to K2 is especially in the range from 1:1 to 10:1.

In certain cases it may be advantageous to give the two components K1 and K2 different colors. This allows the mixing quality to be checked during mixing of the components and mixing errors can be detected at an early stage. This measure also allows qualitative checking of whether the intended mixing ratio has been observed.

A further aspect of the invention relates to a package composed of a packaging and packaged material.

The packaging comprises two chambers separated from one another. The packaged material is a two-component free-radically curing composition consisting of a first component K1 and a second component K2 as described above. Component K1 is in one chamber of the packaging and component K2 is in the other chamber of the packaging.

The packaging especially forms a unit in which the two chambers are held together or directly bound to one another.

The separating means between the chambers may for example be a film or a breakable layer or one or two closures sealing an opening. In a preferred embodiment the packaging is a double cartridge.

Such cartridge packagings are prior art for two-component compositions and disclosed for example in WO2008151849.

A further packaging option is a multi-chamber tubular bag or a multi-chamber tubular bag with an adapter, as disclosed for example in WO 01/44074 A1.

It is preferable when the mixing of the two components K1 and K2 is effected using a static mixer which may be attached to the packaging with two chambers preferably used for this process.

In an industrial-scale plant, the two components K1 and K2 are typically stored separately from one another in vats or hobbocks and expressed and mixed on application, for example using gear pumps. The composition may be applied to a substrate manually or in an automated process using a robot.

The invention further comprises the use of a composition as described above as a sealant or adhesive or for producing coatings. The invention especially comprises the use of the composition for bonding materials having different linear coefficients of thermal expansion, for example for bonding glass and ceramic substrates with plastics and/or metals. The composition is especially suitable for bonding materials whose linear coefficients of thermal expansion have a ratio to one another of ≥2:1. In particular the linear coefficients of thermal expansion of the substrates to be bonded have a ratio to one another of ≥3:1 when the substrates to be bonded are glass or a ceramic substrate and a metal; and a ratio of ≥8:1 when the substrates to be bonded are glass or a ceramic substrate and a plastic. The linear coefficients of thermal expansion especially have a ratio to one another of ≤10 000:1, preferably of ≤100:1.

The invention most preferably comprises the use of a composition as described above as an adhesive or sealant in window construction where glass is bonded with plastics and/or metals, in particular with polyvinyl chloride (PVC) and/or with aluminum.

The term aluminum is presently also to be understood as meaning alloys of aluminum, in particular with copper, magnesium, silicon, manganese and/or zinc. The aluminum may further be subjected to a surface treatment prior to application of the composition. Here, mechanical (grinding, brushing, irradiating, etc.) and/or chemical (pickling, etching, etc.) removal of the oxide layer of the aluminum is typically followed by controlled oxidation of the aluminum, for example by electrolytic oxidation of aluminum (ELOXAL). A further process for surface treatment is so-called enameling, where other inorganic layers, predominantly composed of oxides and silicates, are applied to the aluminum.

The use of a composition according to the invention as a sealant for hem flange bonds is also preferred.

The substrate on whose surface the mixed composition is applied may have been subjected to prior treatment with suitable pretreatment means or cleaning agents. It is particularly suitable to effect pretreatment/cleaning of the substrates with Sika® Cleaner P or Sika® ADPrep which are commercially available from Sika Schweiz AG.

Pretreatment of the substrates with primers and/or adhesion promoters may be useful in certain cases but compositions according to the invention have proven particularly advantageous because they may be applied primerlessly to numerous substrates, in particular to glass, PVC and aluminum, without adverse effects on adhesion.

The invention further comprises a process for bonding substrates S1 and S2 comprising the steps of i) applying a composition as described above to a substrate S1;

ii) contacting the applied composition with a second substrate S2 within the open assembly time;

or i') applying a composition as described above to a substrate S1;

ii') applying a composition as described above to a substrate S2;

iii') joining the two substrates S1 and S2 to which composition has been applied within the open assembly time;

wherein the second substrate S2 is composed of a material identical or different to that of substrate S1. Steps i) or i') and ii') are preceded by a step 1) of at least partial mixing of the two components.

The invention further comprises a process of sealing or coating a substrate S1 comprising the steps of i") applying a composition as described above to a substrate S1;

ii") curing the composition.

Step i") is preceded by a step I) of at least partial mixing of the two components.

The present invention further comprises a cured composition obtained from an above-described composition by a curing process. In cured form the composition has the feature that it does not exhibit viscoelastic behavior and that compressive stress therefore results in no, or almost no, plastic deformation of the composition.

The invention likewise comprises articles bonded or sealed by an above-described process. These articles are preferably a built structure, in particular an above- or below-ground built structure, or an industrial product or a consumer good, in particular a window, a domestic appliance, a tool or a means of transport, in particular a vehicle for traveling on water or land, preferably an automobile, a bus, a truck, a train or a ship. Such articles are preferably also attachable components for industrial products or means of transport, in particular also modular parts, which are used as modules on the manufacturing line and in particular attached or installed by bonding. These prefabricated attachable components are especially employed in the construction of means of transport. Such attachable components include for example drivers cabs of trucks or of locomotives or sunroofs of automobiles. These articles are preferably windows and doors, such as are used in built structures.

EXAMPLES

Examples intended to illustrate the effect of the invention are described hereinbelow.

Monomers Used

TABLE 1

Monomers used.

| Abbreviation | Structure | Name/trade name |
|---|---|---|
| GLYFOMA [1] | 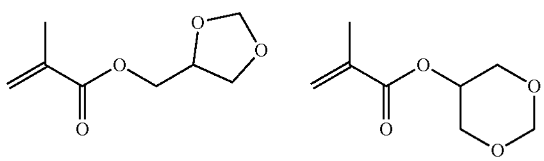 isomer mixture | VISIOMER ® GLYFOMA (Evonik) |
| MMA | 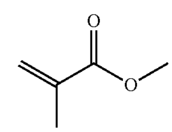 | Methyl methacrylate |
| BNMA [1] | 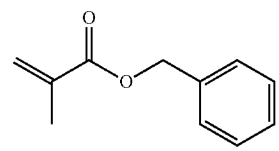 | Benzyl methacrylate |

TABLE 1-continued

Monomers used.

| Abbreviation | Structure | Name/trade name |
|---|---|---|
| THFMA [1] | 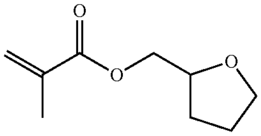 | Tetrahydrofurfuryl methacrylate |
| IBOMA | 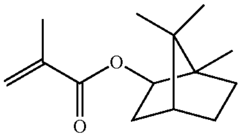 [SMILES: C=C(C)C(=O)OC1CC2CCC1(C)C2(C)C] | Isobornyl methacrylate |
| LATEMA [2] | 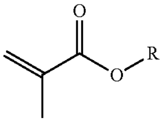 R = $C_{22}H_{25}$ or $C_{24}H_{29}$ | Lauryl tetradecyl methacrylate (Houchi Chemicals) |
| M131 | 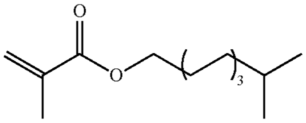 | MIRAMER ® M131 (Miwon); isodecyl methacrylate |
| M193 | 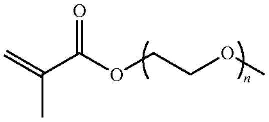 n = 13 | MIRAMER ® M193 (Miwon); methoxy PEG 600 methacrylate |
| M1053 | 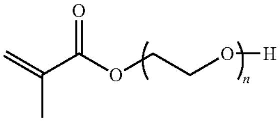 n = 6 | MIRAMER ® M1053 (Miwon); |
| LAMA | 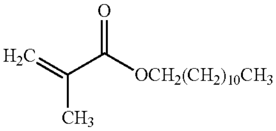 | Lauryl methacrylate |
| STEMA [2] | 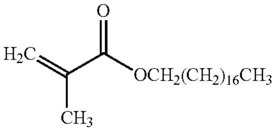 | Stearyl methacrylate |
| HEMA [1] | 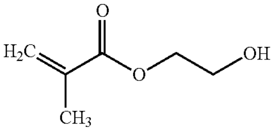 | Hydroxyethyl methacrylate |

[1] Monomer A according to the present invention.

[2] Monomer B according to the present invention.

Production of an Elastomer C

The elastomer C1 was produced as follows:

849 g of polyoxypropylene diol (Acclaim® 4200 N, Bayer MaterialScience; OH number 28.5 KOH/g) and 101 g of 1-isocyanato-3,3,5-trimethyl-5-isocyanatomethylcyclohexane (=isophorone diisocyanate or IPDI; Desmodur® I, Bayer MaterialScience) were reacted at 60° C. to afford an isocyanate-terminated polyurethane polymer having a titrimetrically determined content of free isocyanate groups of 1.88% by weight. Subsequently, 10 g of hydroxyethyl methacrylate (HEMA), which reacts with the free isocyanate groups to afford elastomer C1 of formula (I), was added.

Production of the Compositions

The following compositions were produced:

As component K1 to be tested in each case the constituents specified in tables 2 and 3 in the reported amounts were mixed with one another and incorporated by stirring in a dissolver at a temperature of not more than 80° C. until a macroscopically homogeneous paste was obtained.

As component K2, 46.5% by weight of dibenzoyl peroxide (20% strength) in plasticizer, 50% by weight of chalk, 3% by weight of thixotropic agent and 0.5% by weight of a pigment were mixed with one another in a dissolver. This component K2 was used identically with the respective component K1 from tables 2 and 3 for all experiments.

The produced components K1 and K2 were filled into the separate chambers of coaxial cartridges and, in use, employed in a K1:K2 volume ratio of 10:1.

Description of the Test Methods

Tensile Strength (TS) and breaking elongation (elong.) were determined according to DIN EN 53504 (tensile test speed: 200 mm/min) on films having a layer thickness of 2 mm which cure over 7 days under standard climatic conditions (23±1° C., 50±5% relative humidity). The measurements were carried out on test specimens that had been stored at a room temperature of 23° C. ("RT") and also on test specimens of identical composition that had been stored at −20° C. for 24 hours after curing and were tested directly from the cold cabinet ("−20").

Breaking elongation is a direct measure of the elasticity of a measured sample. Samples which showed a breaking elongation of at least 100% in the "RT" measurement and simultaneously showed a breaking elongation of at least 20% in the "20" measurement are considered to be effective according to the invention.

The results of the breaking elongation measurements are summarized in table 4.

TABLE 2

Inventive components K1 (E1 to E2) and reference components K1 (R1 to R6). All figures in percent by weight based on the respective component K1.

| Example | R1 | E1 | R2 | R3 | R4 | R5 | R6 | E2 |
|---|---|---|---|---|---|---|---|---|
| GLYFOMA | 50 | 35 | 35 | 35 | 35 | — | — | — |
| LATEMA | — | 15 | — | — | — | 15 | — | 15 |
| MMA | — | — | — | — | — | 35 | — | — |
| BNMA | — | — | — | — | — | — | 50 | 35 |
| M131 | — | — | 15 | — | — | — | — | — |
| M193 | — | — | — | 15 | — | — | — | — |
| M1053 | — | — | — | — | 15 | — | — | — |
| Inhibitor [1] | 0.05 | 0.05 | 0.05 | 0.05 | 0.05 | 0.05 | 0.05 | 0.05 |
| Elastomer C1 | 15 | 15 | 15 | 15 | 15 | 15 | 15 | 15 |
| Core-shell [2] | 15 | 15 | 15 | 15 | 15 | 15 | 15 | 15 |
| Filler [3] | 18.97 | 18.97 | 18.97 | 18.97 | 18.97 | 18.97 | 18.97 | 18.97 |
| Activator [4] | 0.98 | 0.98 | 0.98 | 0.98 | 0.98 | 0.98 | 0.98 | 0.98 |

[1] 2,6-di-tert.-butyl-p-cresol;
[2] Kane Ace ™ B382 (Kaneka);
[3] Socal ® U1S2 (Solvay);
[4] N,N-bis(2-hydroxyethyl)-para-toluidine.

TABLE 3

Inventive components K1 (E3 to E5) and reference components K1 (R7 to R11). All figures in percent by weight based on the respective component K1.

| Example | R7 | E3 | R8 | R9 | R10 | E4 | R11 | E5 |
|---|---|---|---|---|---|---|---|---|
| GLYFOMA | — | — | — | — | — | — | 35 | 35 |
| LATEMA | — | 15 | — | 15 | — | 15 | — | — |
| THEMA | 50 | 35 | — | — | — | — | — | — |
| IBOMA | — | — | 50 | 35 | — | — | — | — |
| HEMA | — | — | — | — | 50 | 35 | — | — |
| STEMA | — | — | — | — | — | — | — | 15 |
| LAMA | — | — | — | — | — | — | 15 | — |
| Inhibitor [1] | 0.05 | 0.05 | 0.05 | 0.05 | 0.05 | 0.05 | 0.05 | 0.05 |

TABLE 3-continued

Inventive components K1 (E3 to E5) and reference components K1 (R7 to R11). All figures in percent by weight based on the respective component K1.

| Example | R7 | E3 | R8 | R9 | R10 | E4 | R11 | E5 |
|---|---|---|---|---|---|---|---|---|
| Elastomer C1 | 15 | 15 | 15 | 15 | 15 | 15 | 15 | 15 |
| Core-shell [2] | 15 | 15 | 15 | 15 | 15 | 15 | 15 | 15 |
| Filler [3] | 18.97 | 18.97 | 18.97 | 18.97 | 18.97 | 18.97 | 18.97 | 18.97 |
| Activator [4] | 0.98 | 0.98 | 0.98 | 0.98 | 0.98 | 0.98 | 0.98 | 0.98 |

[1] 2,6-di-tert.- butyl-p-cresol;
[2] Kane Ace ™ B382 (Kaneka);
[3] Socal ® U1S2 (Solvay);
[4] N,N-bis(2-hydroxyethyl)-para-toluidine.

TABLE 4

Measurements of breaking elongation at room temperature (RT, 23° C.) and at −20° C. (−20) of all produced compositions.

| Example | R1 | E1 | R2 | R3 | R4 | R5 | R6 | E2 |
|---|---|---|---|---|---|---|---|---|
| Elong. (RT) [%] | n/m | 153 | 186 | 208 | 61 | 300 | 260 | 380 |
| Elong. (−20) [%] | n/m | 40 | 5 | 7 | 11 | 4 | 3 | 26 |
| TS (RT) [MPa] | n/m | 7.3 | 7.8 | 5.7 | 7.6 | 10 | 8.2 | 4.8 |
| TS (−20) [MPa] | n/m | 15 | 17 | 13 | 17 | 23 | 21 | 14 |

| Example | R7 | E3 | R8 | R9 | R10 | E4 | R11 | E5 |
|---|---|---|---|---|---|---|---|---|
| Elong. (RT) [%] | 290 | 375 | n/m | 1.2 | 50 | 124 | 209 | 193 |
| Elong. (−20) [%] | 3 | 50 | n/m | n/m | 5 | 36 | 13 | 26 |
| TS (RT) [MPa] | 8.6 | 5.6 | n/m | 5.4 | 12 | 7.1 | 6.1 | 7.2 |
| TS (−20) [MPa] | 21 | 14 | n/m | n/m | 18 | 14 | 13 | 15 |

The term “n/m” indicates that the specimen was so brittle that no measurement was possible.

The results in table 4 show that only the selected combinations of inventive monomers A and B result in sufficient elasticity at room temperature coupled with sufficient low-temperature elasticity.

The invention claimed is:

1. A two-component composition consisting of a component K1, comprising a) at least one monomer A according to formula (IIIa), (IIIa)

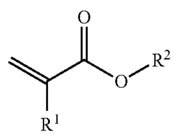

wherein $R^1$ is either a hydrogen atom or a methyl group;

$R^2$ is either a linear or branched hydroxyalkyl group having 2 to 6 carbon atoms or a radical having 4 to 8 carbon atoms comprising either a phenyl group or an aliphatic 5- or 6-membered ring with at least one ether oxygen in the ring structure;

b) at least one monomer B according to formula (IIIb), (IIIb)

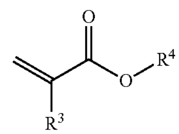

wherein $R^3$ is either a hydrogen atom or a methyl group;

$R^4$ is a linear alkyl radical having more than 12 carbon atoms in the chain;

c) between 10% by weight and 20% by weight, based on component K1, of at least one elastomer C of formula (I), (I)

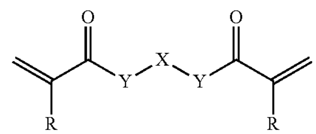

wherein R is either a hydrogen atom or a methyl group; X is a polymeric polyol after removal of two OH groups; and Y is O or NR", wherein R" is a hydrocarbon radical or a hydrogen atom; and d) optionally at least one additive selected from the group consisting of core-shell polymer, activator for free-radical curing, inhibitor for free-radical curing, filler and adhesion promoter;

with the proviso that component K1 contains between 25% by weight and 75% by weight, based on component K1, of the mixture of monomer A and monomer B, and with the proviso that the mass ratio of monomer A to monomer B in component K1 is between 1:1 and 9:1;

and a component K2, comprising at least one initiator for free-radical curing.

2. The two-component composition as claimed in claim 1, wherein $R^2$ is a hydroxyethyl group or a benzyl group or at least one of the groups (IVa) to (IVc) in formula (IV), (IV)

(IVa)

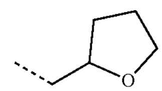

-continued (IVb)

(IVc)

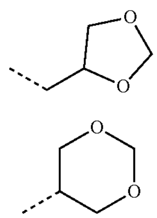

wherein the dashed lines in formula (IV) represent the bond between the oxygen atom and $R^2$.

3. The two-component composition as claimed in claim 1, wherein the elastomer C of formula (I) has an average molecular weight (Mn) of 1000 to 40 000 g/mol.

4. The two-component composition as claimed in claim 1, wherein elastomer C is a polyurethane (meth)acrylate, wherein a diol D reacts with a diisocyanate, which is present in stoichiometric excess;

and the resulting isocyanate-terminated polyurethane is reacted with the (meth)acrylic ester having a hydroxyl group, to afford the elastomer C of formula (I).

5. The two-component composition as claimed in claim 1, wherein the composition in component K1 additionally contains between 0.5% by weight and 5% by weight, based on component K1, of an adhesion promoter, or contains a (meth)acrylate of formula (II), (II)

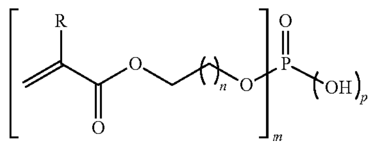

wherein R' is either a hydrogen atom or a methyl group;

n represents a value of 1 to 15;

m represents a value of 1 to 3;

and p represents a value of 3 minus m.

6. The two-component composition as claimed in claim 1, wherein the composition in component K1 additionally contains between 5% by weight and 20% by weight, based on component K1, of at least one core-shell polymer.

7. The two-component composition as claimed in claim 1, wherein the composition in component K1 additionally contains between 0.5% by weight and 2.5% by weight, based on component K1, of at least one activator for free-radical curing.

8. The two-component composition as claimed in claim 1, wherein the composition in component K1 additionally contains between 5% by weight and 30% by weight, based on component K1, of at least one filler.

9. The two-component composition as claimed in claim 1, wherein the composition in component K1 additionally contains between 0.001% by weight and 0.5% by weight, based on component K1, of at least one inhibitor for free-radical curing.

10. The two-component composition as claimed in claim 1, wherein component K2 of the composition contains between 5% by weight and 75% by weight, based on component K2, of the at least one initiator for free-radical curing, or a photoinitiator.

11. The two-component composition as claimed in claim 1, wherein component K2 of the composition additionally contains at least one additive selected from the group consisting of plasticizer, filler, thixotropic additive and colorant.

12. An adhesive or sealant or coating comprising or formed using the two-component composition as claimed in claim 1.

13. A method comprising bonding materials having different linear coefficients of thermal expansion using the adhesive as claimed in claim 12.

14. A process for bonding substrates S1 and S2 comprising the steps of i) applying a composition as claimed in claim 1 to a substrate S1;

ii) contacting the applied composition with a second substrate S2 within the open assembly time;

or i') applying a composition as claimed in claim 1 to a substrate S1;

ii') applying a composition as claimed in claim 1 to a substrate S2;

iii') joining the two substrates S1 and S2 to which composition has been applied within the open assembly time;

wherein the second substrate S2 is composed of a material identical or different to that of substrate S1;

and wherein steps i) or i') and ii') are preceded by a step I) of partial or complete mixing of the two components K1 and K2.

15. An article bonded by a process as claimed in claim 14.

* * * * *